United States Patent
Kim et al.

(10) Patent No.: US 10,721,493 B2
(45) Date of Patent: Jul. 21, 2020

(54) VIDEO ENCODING DEVICE AND DRIVING METHOD THEREOF

(71) Applicant: Samsung Electronics Co., Ltd., Suwon-si (KR)

(72) Inventors: Sung-Jei Kim, Seoul (KR); Nyeong-Kyu Kwon, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 498 days.

(21) Appl. No.: 14/518,336

(22) Filed: Oct. 20, 2014

(65) Prior Publication Data

US 2015/0117528 A1    Apr. 30, 2015

(30) Foreign Application Priority Data

Oct. 24, 2013   (KR) ................ 10-2013-0127380

(51) Int. Cl.
   *H04N 19/91*     (2014.01)
   *H04N 19/86*     (2014.01)
   *H04N 19/82*     (2014.01)
   *H04N 19/176*    (2014.01)
   (Continued)

(52) U.S. Cl.
CPC .......... *H04N 19/86* (2014.11); *H04N 19/117* (2014.11); *H04N 19/14* (2014.11); *H04N 19/176* (2014.11); *H04N 19/82* (2014.11)

(58) Field of Classification Search
CPC .. H04N 19/176; H04N 19/593; H04N 19/117; H04N 19/44; H04N 19/196; H04N 19/463; H04N 19/61; H04N 19/82; H04N 19/159; H04N 19/186; H04N 19/30; H04N 19/86; H04N 19/129; H04N 19/46; H04N 19/96; H04N 19/00424; H04N 19/00545; H04N 19/00951; H04N 19/107; H04N 19/70; H04N 19/174; H04N 19/18; H04N 19/103; H04N 19/105; H04N 19/154; H04N 19/597; H04N 19/91; H04N 19/0006; H04N 19/182; H04N 19/126; H04N 19/12;
(Continued)

(56) References Cited

U.S. PATENT DOCUMENTS

| 6,816,750 | B1 | 11/2004 | Klaas |
| 7,093,147 | B2 | 8/2006 | Farkas et al. |
| 7,526,245 | B2 | 4/2009 | Bushner |

(Continued)

FOREIGN PATENT DOCUMENTS

| KR | 101117000 | 3/2012 |
| KR | 2013034763 | 4/2013 |

(Continued)

OTHER PUBLICATIONS

Greenhalgh, Big. Little Processing With Arm Cortex-A15 & Cortex-A7, White Paper Arm, Sep. 2011, pp. 1-8.

*Primary Examiner* — Dave Czekaj
*Assistant Examiner* — Kehinde Abimbola
(74) *Attorney, Agent, or Firm* — Onello & Mello, LLP

(57) ABSTRACT

A video encoding device includes a pixel offset pre-calculation part configured to generate a loop-filtered pixel from a coding information and at least one of a source pixel, a predicted pixel and a restructured pixel, and configured to generate an offset from the loop-filtered pixel by performing a sample adaptive offset operation. The video encoding device also includes an entropy coding part configured to generate a bit stream from the offset.

20 Claims, 15 Drawing Sheets

(51) Int. Cl.
*H04N 19/14* (2014.01)
*H04N 19/117* (2014.01)

(58) Field of Classification Search
CPC ...... H04N 19/436; H04N 19/50; H04N 19/80; H04N 19/14
See application file for complete search history.

(56) References Cited

U.S. PATENT DOCUMENTS

| | | | |
|---|---|---|---|
| 7,558,428 B2 | 7/2009 | Shen et al. | |
| 7,594,126 B2 | 9/2009 | Yun et al. | |
| 7,656,237 B2 | 2/2010 | Riley et al. | |
| 7,930,530 B2 | 4/2011 | Roh et al. | |
| 8,660,174 B2 * | 2/2014 | Fu | H04N 19/46 375/240 |
| 8,811,484 B2 * | 8/2014 | Motta | H04N 19/147 375/240.01 |
| 9,001,883 B2 * | 4/2015 | Tsai | H04N 19/136 375/240 |
| 2004/0242224 A1 | 12/2004 | Janik et al. | |
| 2007/0002150 A1 | 1/2007 | Abe | |
| 2007/0086524 A1 * | 4/2007 | Chen | H04N 19/51 375/240.16 |
| 2009/0245374 A1 * | 10/2009 | Hsu | H04N 19/105 375/240.16 |
| 2010/0002770 A1 * | 1/2010 | Motta | H04N 19/147 375/240.16 |
| 2010/0191356 A1 | 7/2010 | Wehrenberg et al. | |
| 2010/0205467 A1 | 8/2010 | Park | |
| 2011/0057722 A1 | 3/2011 | Komyo et al. | |
| 2011/0161650 A1 | 6/2011 | Paksoy et al. | |
| 2011/0218870 A1 | 9/2011 | Shams et al. | |
| 2011/0305274 A1 * | 12/2011 | Fu | H04N 19/46 375/240.02 |
| 2012/0020410 A1 * | 1/2012 | Chang | H04N 19/61 375/240.16 |
| 2012/0177107 A1 | 7/2012 | Fu et al. | |
| 2012/0207214 A1 | 8/2012 | Zhou et al. | |
| 2012/0207227 A1 * | 8/2012 | Tsai | H04N 19/136 375/240.29 |
| 2012/0230397 A1 | 9/2012 | Ouedraogo et al. | |
| 2012/0230405 A1 * | 9/2012 | An | H04N 19/105 375/240.13 |
| 2012/0262493 A1 | 10/2012 | Tsai et al. | |
| 2013/0083607 A1 | 4/2013 | Joo et al. | |
| 2013/0094569 A1 | 4/2013 | Chong et al. | |
| 2013/0263077 A1 | 10/2013 | Baek et al. | |
| 2013/0339771 A1 | 12/2013 | Ryu | |
| 2014/0047248 A1 | 2/2014 | Heo et al. | |
| 2014/0075224 A1 | 3/2014 | Lee et al. | |
| 2014/0092984 A1 * | 4/2014 | Fang | H04N 19/46 375/240.24 |
| 2014/0177704 A1 * | 6/2014 | Pu | H04N 19/70 375/240.02 |
| 2014/0198844 A1 * | 7/2014 | Hsu | H04N 19/00066 375/240.07 |
| 2015/0023420 A1 * | 1/2015 | Minezawa | H04N 19/00951 375/240.13 |
| 2015/0256827 A1 * | 9/2015 | Minezawa | H04N 19/593 375/240.03 |
| 2015/0326886 A1 * | 11/2015 | Chen | H04N 19/61 375/240.02 |
| 2016/0021379 A1 * | 1/2016 | Minezawa | H04N 19/463 375/240.13 |

FOREIGN PATENT DOCUMENTS

| | | |
|---|---|---|
| KR | 2013110961 | 10/2013 |
| KR | 2013141218 | 12/2013 |
| KR | 2014020514 | 2/2014 |
| KR | 2014033663 | 3/2014 |

* cited by examiner

FIG. 4

| IME | FME | IPR | EC | LF |

FIG. 5

| IME | FME | IPR | DF | SAO | EC |

FIG. 11

| IME | FME | IPR | EC | DF | SAO |
|-----|-----|-----|-----|-----|-----|
|     |     | POP |     |     |     |

FIG. 12

| IME | FME | IPR | EC |
|-----|-----|-----|-----|
|     |     | POP | DF | SAO |

FIG. 13

| IME | FME | IPR | POP | EC | DF | SAO |

FIG. 14

| IME | FME | IPR | POP | EC |
| | | | | DF | SAO |

VIDEO ENCODING DEVICE AND DRIVING METHOD THEREOF

CROSS-REFERENCE TO RELATED APPLICATION

This application claims priority under 35 U.S.C. § 119 from Korean Patent Application No. 10-2013-0127380 filed on Oct. 24, 2013, the disclosure of which is hereby incorporated by reference in its entirety.

BACKGROUND

1. Technical Field

Embodiments of the inventive concepts described herein relate to a video encoding device. In particular, the inventive concepts relate to a video encoding device for video coding following the High Efficiency Video Coding (HEVC) standard, and a driving method thereof.

2. Description of the Related Art

Recently, the Moving Picture Experts Group (MPEG) as a working group of the ISO/IEC technical committee and the ITU-T Video Coding Experts Group (VCEG) have organized the Joint Collaborative Team for Video Coding (JCT-VC). The JCT-VC is working on establishing the next generation of video compression for the High Efficiency Video Coding (HEVC) standard. The JCT-VC aims to improve coding efficiency up to 50% more than that of the H.264/AVC format, which previously had the best video compression rate. The HEVC standard has been adopted as a different coding architecture from H.264/AVC, and is designed for effective coding ranging from a small-sized video to a large-sized video. A prediction part and a transform coding part have a hierarchical quadtree structure and, in particular, the transform coding part is widely expanded to cover from small-sized transform blocks up to 32×32 transform blocks and can be coded with a hierarchical transform structure.

In the HEVC standard, a basic coding technique having a hierarchical variable block size, a prediction technique and a transform/quantization technique are used. In addition, in the HEVC standard, a loop filter operation is performed before performing an entropy coding operation. Thus, a video encoding device using the HEVC standard can increase the size of a buffer for retaining a source pixel and coding information.

SUMMARY

Embodiments of the inventive concept provide a video encoding device that performs an entropy coding operation, and then performs a loop filter operation.

In one aspect, a video encoding device comprises a pixel offset pre-calculation (POP) part configured to generate a loop-filtered pixel from a coding information (CI) and at least one of a source pixel, a predicted pixel and a restructured pixel, and configured to generate an offset from the loop-filtered pixel by performing a sample adaptive offset (SAO) operation. An entropy coding (EC) part is configured to generate a bit stream from the offset.

In some embodiments, the POP part includes a pixel offset pre-calculation de-blocking filter (POPDF) configured to smooth an edge within a video data to create a de-blocked filtered pixel, the edge existing between or within blocks of a frame of the video data, and a pixel offset pre-calculation sample adaptive offset (POPSAO) part configured to classify the de-blocking filtered pixel by a category and generate the offset corresponding to the respective category.

In some embodiments, the SAO operation classifies the loop filtered pixel by a category, and generates the offset based on the classified category.

In some embodiments, the CI includes one of a boundary strengthen (BS), a Mode, a motion vector (MV) and a quantization parameter (QP).

In some embodiments, the video encoding device further comprises a loop filter (LF) configured to generate a reference pixel, wherein the LF includes a de-blocking filter configured to perform de-blocking filtering on the restructured pixel, and an SAO part configured to add the offset to the restructured pixel and generate the reference pixel.

In another aspect, an application processor comprises a memory controller configured to control a memory device for reproducing moving picture data. A video encoding device is configured to receive the moving picture data through the memory controller. The video encoding device includes a pixel offset pre-calculation (POP) part configured to generate a loop-filtered pixel from a coding information (CI) and at least one of a source pixel, a predicted pixel and a restructured pixel. The video encoding device is configured to generate an offset from the loop-filtered pixel by performing a sample adaptive offset (SAO) operation. An entropy coding (EC) part is configured to generate a bit stream from the offset.

In some embodiments, the POP part includes a pixel offset pre-calculation de-blocking filter (POPDF) configured to smooth an edge within a video data to create a de-blocking filtered pixel, the edge existing between or within blocks of a frame of the video data. A pixel offset pre-calculation sample adaptive offset (POPSAO) part is configured to classify the de-blocking filtered pixel by a category and generate the offset corresponding to the respective category.

In some embodiments, the video encoding device has a pipeline structure.

In some embodiments, the pipeline includes an integer-pel motion estimation (IME) part, a fractional-pel motion estimation (FME) part, an intra prediction with reconstruction (IPR) part, a POP part, an EC part, and a loop filter (LF).

In some embodiments, the video encoding device sequentially performs an IME operation with the IME part, an FME operation with the FME part and an IPR operation with the IPR part.

In some embodiments, the video encoding device simultaneously performs the IPR operation and the POP operation.

In some embodiments, the video encoding device performs the LF operation after an EC operation performed with the EC part is completed.

In some embodiments, the video encoding device performs a POP operation with the POP part, before performing the EC operation.

In some embodiments, the LF includes a de-blocking filter (DF) and an SAO part. The video encoding device sequentially performs a DF operation with the DF and an SAO operation with the SAO part.

In some embodiments, the video encoding device simultaneously performs the EC operation and the DF operation.

In some embodiments, the video encoding device follows the High Efficiency Video Coding (HEVC) standard.

In another aspect, a driving method of a video encoding device comprises performing a pixel offset pre-calculation (POP) operation by generating a loop-filtered pixel from a coding information and at least one of a source pixel, a predicted pixel and a restructured pixel. The POP operation further generates an offset from the loop-filtered pixel by performing a sample adaptive offset (SAO). An entropy coding (EC) part generates a bit stream from the offset.

In some embodiments, the driving method further comprises performing a loop filtering (LF) operation with an LF part after performing an EC operation with the EC part.

In some embodiments, the LF operation includes smoothing an edge within a video data with a de-blocking filter (DF), to create a de-blocking filtered pixel. The edge exists between or within blocks of a frame of the video data. The blocks correspond to the restructured pixel. An offset is added to the restructured pixel by performing an SAO operation.

In some embodiments, the source pixel is received and a motion vector in a unit of a fractional pixel is predicted, by an integer-pel motion estimation (IME) part. An intra prediction and reconstruction (IPR) operation is performed by intra predicting and generating the restructured pixel corresponding to the intra predicted pixel.

In some embodiments, the IPR operation and the POP operation are performed simultaneously.

In another aspect, a mobile device comprises a memory device configured to store video data. An application processor includes a video encoding device configured to encode the video data. The video encoding device includes a pixel offset pre-calculation (POP) part configured to generate a loop-filtered pixel from a coding information and a least one of a source pixel, a predicted pixel and a restructured pixel. The video encoding device is configured to generate an offset from the loop-filtered pixel by performing a sample adaptive offset (SAO) operation. An entropy coding (EC) part is configured to generate a bit stream from the offset.

In some embodiments, the POP part includes a pixel offset pre-calculation de-blocking filter (POPDF) configured to smooth an edge within a video data to crate a de-blocked filtered pixel. The edge exists between or within blocks of a frame of the video data. A pixel offset pre-calculation sample adaptive offset (POPSAO) part is configured to classify the de-blocking filtered pixel by a category and to generate the offset corresponding to the respective category.

In some embodiments, the video encoding device has a pipeline structure including an integer-pel motion estimation part, a fractional-pel motion estimation part, an intra prediction with reconstruction part, a pixel offset pre-calculation part, an entropy coding part, and a loop filter.

In some embodiments, the video encoding device follows the High Efficiency Video Coding standard.

In another aspect, a mobile device comprises an application processor (AP) including a video encoding device configured to encode video data conforming to a High Efficiency Video Coding standard and a memory controller. The video encoding device includes a pixel offset pre-calculation (POP) device configured to generate a loop-filtered pixel. A sample adaptive offset (SAO) device is configured to generate an offset from the loop-filtered pixel. An entropy coding (EC) device is configured to generate from the offset, a bit stream of video data corresponding to a pixel. A memory device is configured to store video data and is electrically connected to the AP through the memory controller. AN input device is configured to accept input commands to program the AP. An image sensor is configured to receive an input stream of uncompressed video data. A display device is configured to display an output stream of video data from the AP.

In some embodiments, the memory device is a dynamic random access memory.

In some embodiments, the input device is a touch pad.

In some embodiments, the image sensor is a charged coupled device.

In some embodiments, the display device is a liquid crystal device.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings:

FIG. 4 shows a pipeline structure of a video encoding device following the MPEG-4 or H.264/AVC standard;

FIG. 5 shows a pipeline structure of a video encoding device following the High Efficiency Video Coding (HEVC) standard;

FIG. 11 shows a pipeline structure of a video encoding device in accordance with an embodiment of the inventive concept;

FIG. 12 shows a pipeline structure of a video encoding device in accordance with another embodiment of the inventive concept;

FIG. 13 shows a pipeline structure of a video encoding device in accordance with still another embodiment of the inventive concept;

FIG. 14 shows a pipeline structure of a video encoding device in accordance with yet another embodiment of the inventive concept;

DETAILED DESCRIPTION OF THE EMBODIMENTS

Figure 1:
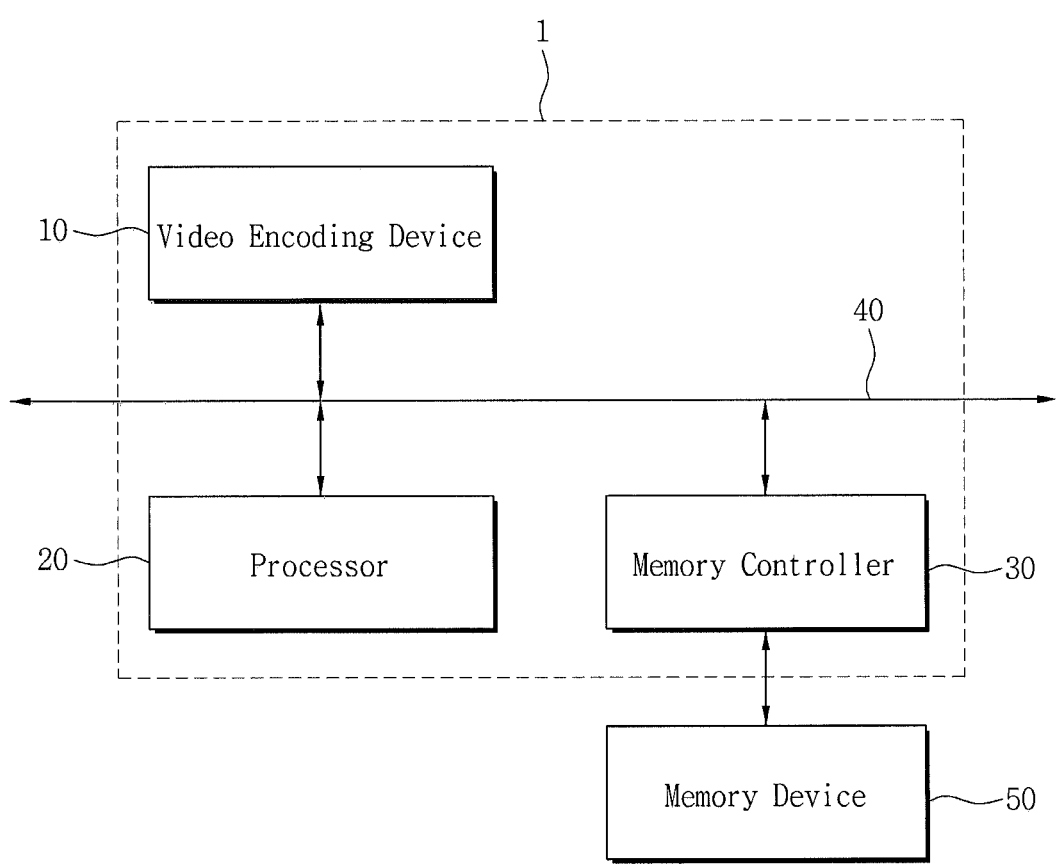
FIG. 1 is a block diagram illustrating an application processor (AP) in accordance with embodiments of the inventive concept.

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concepts to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section respectively. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are envisioned within the scope of this disclosure. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In other embodiments, a function (or an operation) pertaining to a particular block will be performed in a different order from that illustrated in a corresponding flowchart without departing from the spirit or scope of the disclosure. For example, in one embodiment, the functions associated with two consecutive blocks are performed in a substantially simultaneous manner. In another embodiment, the functions associated with two consecutive blocks are performed in a reverse order.

Hereinafter, a video encoding device and a driving method thereof will be described in accordance with embodiments of the inventive concept and accompanying figures.

A video encoding device in accordance with a first embodiment of the inventive concept performs an entropy coding operation before performing a loop filter operation. The video encoding device in accordance with the first embodiment of the inventive concept will be described with reference to FIGS. 2 to 14.

An application processor in accordance with a second embodiment of the inventive concept includes a video encoding device. The application processor in accordance with the second embodiment of the inventive concept will be described with reference to FIG. 1.

A driving method of the application processor in accordance with a third embodiment of the inventive concept includes an entropy coding operation, and a loop filter operation. The driving method of the application processor in accordance with the third embodiment of the inventive concept will be described with reference to FIG. 8.

A mobile device in accordance with a fourth embodiment of the inventive concept includes the application processor. The mobile device in accordance with the fourth embodiment of the inventive concept will be described with reference to FIGS. 17 to 19.

FIG. 1 is a block diagram illustrating an application processor (AP) in accordance with embodiments of the inventive concept.

Referring to FIG. 1, an AP 1 in accordance with embodiments of the inventive concept includes a video encoding device 10, a processor 20, a memory controller 30, and a system bus 40.

In another embodiment, the AP 1 of FIG. 1 further includes at least one of an image signal processor (ISP), a 3-dimensional graphic accelerator, an input/output interface block, a Universal Serial Bus (USB) 3.0 host block and a USB 3.0 slave block.

The video encoding device 10 encodes video data and generates a bit stream, or alternatively, decodes the bit stream and reproduces the bit stream as video data. In some embodiments, the video encoding device 10 follows the High Efficiency Video Coding (HEVC) standard.

In certain embodiments, the video encoding device 10 includes a pipeline structure as will be described with reference to FIG. 11 to FIG. 14.

The video encoding device 10 in accordance with certain embodiments performs loop filtering before performing an entropy coding operation. In other embodiments, the video encoding device 10 performs the entropy coding operation and the loop filtering substantially in parallel. The video encoding device 10 in accordance with embodiments of the inventive concept will be described in detail with reference to FIG. 2.

In certain embodiments, the processor 20 controls the video encoding device 10 and the memory controller 30. In addition, the processor 20 accesses a memory device 50 through the memory controller 30. In some embodiments, the processor 20 is an ARM™ processor.

The memory controller 30 controls the memory device 50. In some embodiments, when the memory device 50 is a dynamic random access memory (DRAM), and the memory controller 30 is a DRAM controller.

The system bus 40 interactively connects the video encoding device 10, the processor 20 and the memory controller 30.

Figure 2:
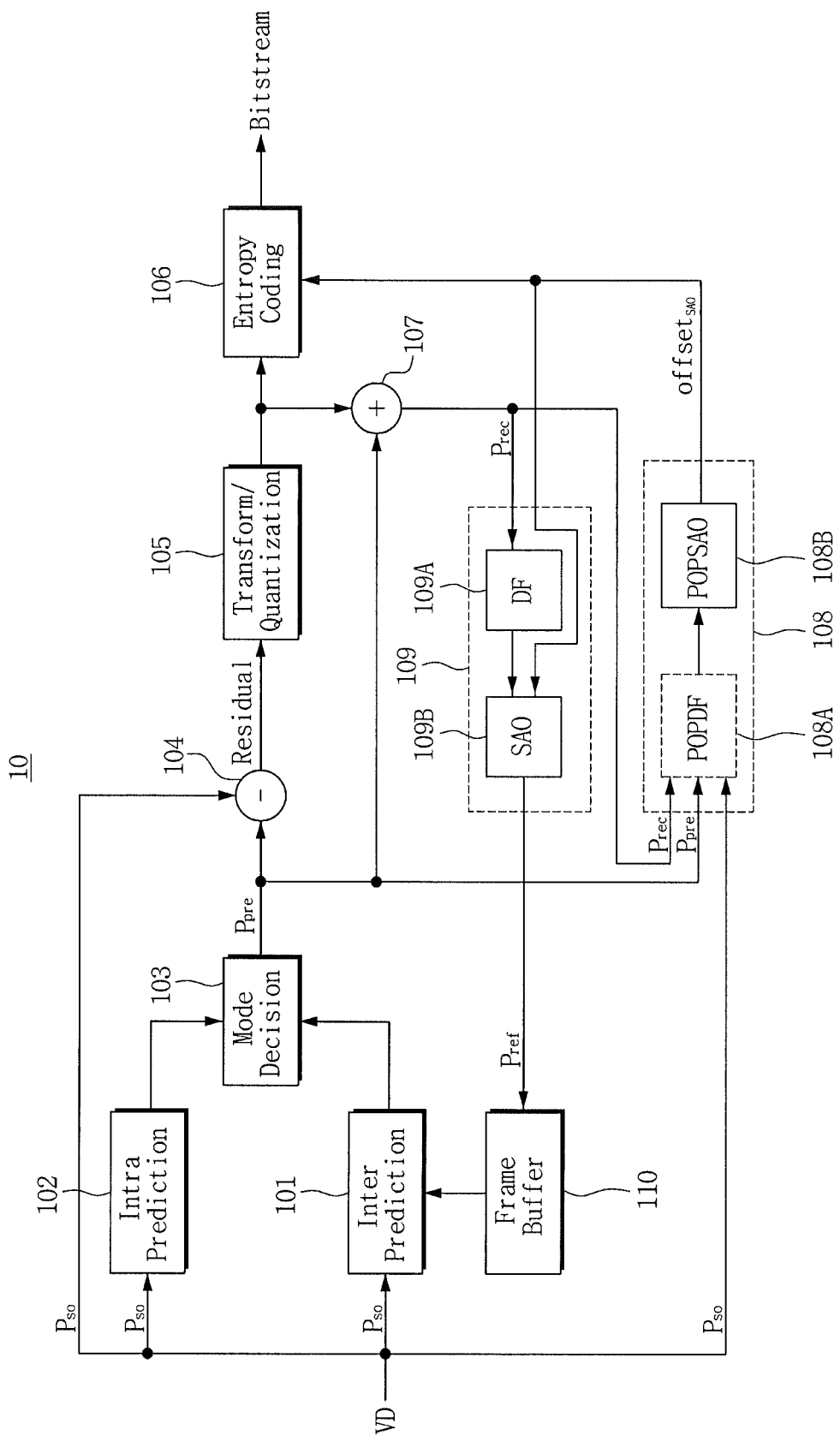
FIG. 2 is a block diagram illustrating a video encoding device shown in FIG. 1 in detail.

Traditionally, a video encoding device based on the HEVC standard and similar to that shown in FIG. 2, performs loop filtering, and then performs an entropy coding operation. This approach to video encoding requires an increase in the size of a buffer for retaining a source pixel and coding information to perform the entropy coding operation.

Advantageously, the video encoding device 10 in accordance with embodiments of the inventive concept performs the loop filtering before performing the entropy coding operation. This is achieved by including an inter prediction part 101, an intra prediction part 102, a mode decision part 103, a differential part 104, a transform/quantization part 105, an entropy coding part 106, a summation part 107, a pixel offset pre-calculation (POP) part 108, a loop filter 109, and a frame buffer 110 to the video encoding device 10.

Video data (VD) includes a plurality of frames, based on temporal slices, to reproduce a moving picture. Each of the plurality of frames is further subdivided into a two-dimensional matrix (or group) of blocks, (for example 16×16, 32×32 or 64×64). In addition, the VD includes a source pixel $P_{so}$. It should be appreciated that other groups of blocks are envisioned within the scope of this disclosure.

The inter prediction part 101 receives the source pixel $P_{so}$. The inter prediction part 101 divides one frame associated with the source pixel $P_{so}$ into a plurality of blocks, and perform an intra coding operation for removing redundant parts using information from consecutive frames. The inter prediction part 101 generates a predicted pixel $P_{pre}$ based on an inter prediction mode.

The intra prediction part 102 receives the source pixel $P_{so}$. The intra prediction part 102 does not use information from other frames, but rather performs intra coding to remove redundant parts using the characteristics within one frame from the source pixel $P_{so}$. The intra prediction part 102 generates the predicted pixel $P_{pre}$ based on an intra prediction mode.

The mode decision part 103 determines whether it is the inter prediction mode or the intra prediction mode. Furthermore, the mode decision part 103 determines whether it is an 8×8 or 16×8 mode in the inter prediction mode. The mode decision part 103 transmits the predicted pixel $P_{pre}$ to the differential part 104.

In one embodiment, the mode decision part 103 also generates coding information (CI). The CI includes at least one of a BS, a Mode, an MV and a QP. The BS denotes boundary strengthening. The Mode denotes whether the mode decision part 103 is operating in an intra prediction mode or an inter prediction mode. The MV denotes a motion vector. The QP denotes a quantized level.

The differential part 104 generates a residual value by calculating a difference between a frame of the video data associated with the source pixel $P_{so}$ and the predicted pixel $P_{pre}$.

The transform/quantization part 105 performs a discrete cosine transform, quantizes the residual value, and generates a quantized transform coefficient. Subsequently, the entropy coding part 106 generates a bit stream using the quantized transform coefficient and a sample adaptive offset (SAO) (e.g. $Offset_{SAO}$) received from the POP part 108.

The summation part 107 generates a restructured pixel using a value obtained by inverting and dequantizing the output of the transform/quantization part 105 and using the predicted pixels $P_{pre}$ received from the mode decision part 103. The summation part 107 transmits the restructured pixels $P_{rec}$ to the POP part 108 and the loop filter 109.

In one embodiment, the POP part 108 includes a pixel offset pre-calculation de-blocking filter (POPDF) 108A and a pixel offset pre-calculation sample adaptive offset (POP-SAO) part 108B.

In one embodiment, the POPDF 108A is selectively embodied (e.g. the POP 108 includes the POPDF 108A but excludes the POPSAO 108B). In another embodiment, the POPDF 108A is replaced with a POP without de-blocking filtering, by skipping deblocking filtering in the video encoding and decoding processes.

The POP part 108 receives the restructured pixel $P_{rec}$ from the summation part 107, the source pixel $P_{so}$ the predicted pixel $P_{pre}$ from the mode decision part 103. In another embodiment, the POP part 108 receives the CI including at least one of a BS, Mode, MV and QP from the mode decision part 103.

The POPDF 108A generates a loop-filtered pixel using the coding information and one of the source pixel $P_{so}$, the predicted pixel $P_{pre}$, and the restructured pixel $P_{rec}$. The POPSAO part 108B performs an SAO operation. The SAO part classifies the loop-filtered pixel by a category, and calculates an offset $Offset_{SAO}$ based on the classified category. The POPSAO part 108B transmits the offset $Offset_{SAO}$ to the entropy coding part 106 and the loop filter 109.

In one embodiment, where the POP 108 does not include the POPDF 108A, the POPSAO part 108B directly classifies one of the source pixel $P_{so}$, the predicted pixel $P_{pre}$, and the restructured pixel $P_{rec}$ by a category, and calculates the offset $Offset_{SAO}$ based on the classified category.

In general, the BS that is optionally contained in the coding information is calculated in either the POPDF 108A or the POPSAO part 108B. Otherwise, the summation part 107 can pre-calculate the BS using the Mode, the MV and the QP, which are alpha, beta and the coding information from the head of the frames. The alpha and beta denote parameters commonly used in one frame. In one example, the head of a frame is the preamble of the frame.

In one embodiment, the loop filter 109 includes a de-blocking filter (DF) 109A and an SAO part 109B. The DF 109A performs de-blocking filtering to generate smooth edges from vertical or horizontal sharp edges existing between or in blocks in VD. The SAO part 109B classifies the de-blocking filtered pixel by a category and generates the offset corresponding to the respective category.

The DF 109A performs de-blocking filtering on the restructured pixel $P_{rec}$. The SAO part 109B adds the offset $Offset_{SAO}$ to the restructured pixel $P_{rec}$. Therefore, the SAO part 109B generates a reference pixel $P_{ref}$. The SAO part 109B transmits the reference pixel $P_{ref}$ to a frame buffer 110.

The frame buffer 110 stores the reference pixel $P_{ref}$ received from the loop filter 109. Once one frame is created by summation of all blocks, the frame buffer 110 transmits the reference pixel $P_{ref}$ to the inter prediction part 101.

Figure 3A:
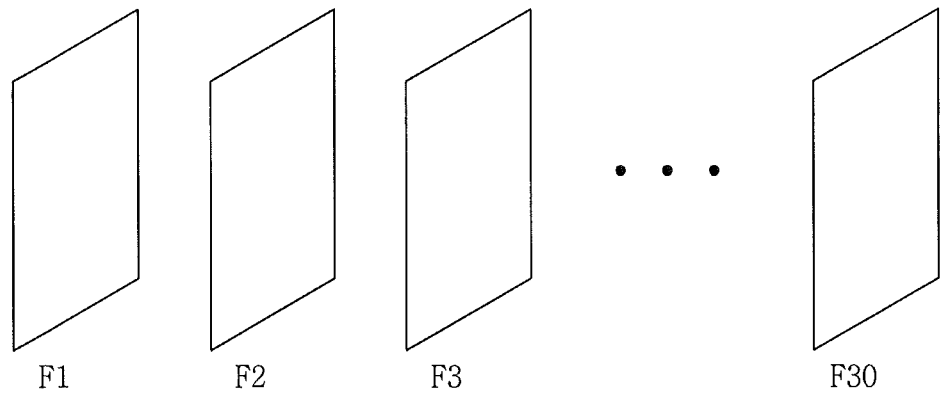
FIG. 3A shows video data shown in FIG. 2.

FIG. 3A shows the video data shown in FIG. 2.

Referring to FIG. 2 and FIG. 3A, the VD issued for reproducing a moving picture. Thus, the VD is configured with a plurality of frames for reproducing the moving picture. In some embodiments, the VD for reproducing the moving picture data for one second is configured with the first to thirtieth frames F1 to F30 (for example, when a video sampling rate of 30 Hz is used).

Figure 3B:
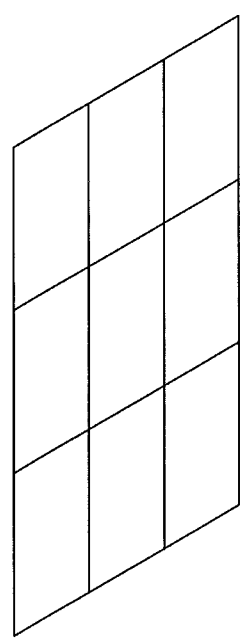
FIG. 3B shows a first frame shown in FIG. 3A in detail.

FIG. 3B shows the first frame F1 shown in FIG. 3A, including the further subdivision of a frame into a matrix of blocks.

Referring to FIG. 2, FIG. 3A and FIG. 3B, the first frame F1 is configured with a plurality of blocks. In addition, the second to thirtieth frames F2 to F30 are configured in the same manner as the first frame F1. In some embodiments, the first frame F1 may be configured with 9 blocks, in a 3×3 matrix as shown in FIG. 3B.

Figures 4, 5:
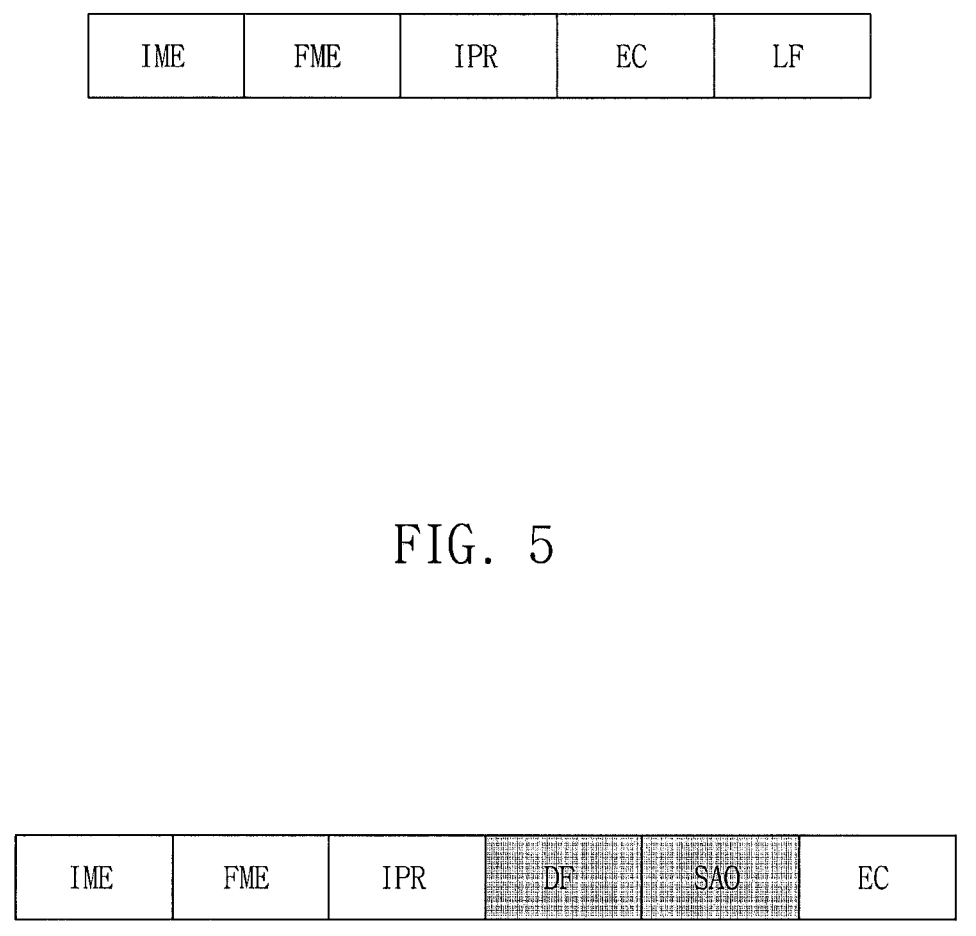

FIG. 4 shows a pipeline structure of a video encoding device following either the MPEG-4 or the H.264/AVC standard.

Referring to FIG. 2 and FIG. 4, a pipeline following the MPEG-4 or H.264/AVC standard includes an integer-pel motion estimation (IME) part, a fractional-pel motion estimation (FME) part, and an intra prediction with reconstruction (IPR) part, an entropy coding (EC) part and a loop filter (LF) part.

A video coding part includes the IME part, the FME part, the IPR part and the EC part. A post-processing part includes the LF.

The inter prediction part 101 performs the IME operation and the FME operation. The IME part predicts an MV using integer units for a pixel. The FME part predicts an MV using fractional units for a pixel.

The intra prediction part 102 and the transform/quantization part 105 perform the IPR operation. The IPR part performs an intra estimation operation in the intra prediction part 102, and performs reconstruction operation on the intra predicted pixel in the transform/quantization part 105. The entropy coding part 106 performs the EC operation. The loop filter 109 performs the LF operation. In one embodiment, the loop filter 109 following the MPEG-4 or H.264/AVC standard acts as a de-blocking filter. The de-blocking filter removes blocking artifacts.

In one example, the video encoding device 10 following the MPEG-4 or H.264/AVC standard first performs the EC operation, and then performs the LF operation.

FIG. 5 shows a pipeline structure of a video encoding device following the HEVC standard. Referring to FIG. 5, an example of a pipeline following the HEVC standard includes an IME part, an FME part, an IPR part, a DF, an SAO part and an EC part.

The loop filter following the HEVC standard includes the DF and the SAO part. The DF performs de-blocking filtering to generate smooth edges from vertical or horizontal sharp edges existing in input pictures, and the SAO part classifies a de-blocking filtered picture by a category and calculates an offset $Offset_{SAO}$ based on the respective category.

Advantageously, the pipeline structure following the HEVC standard mitigates visual artifacts. In general, the visual artifacts includes both blocking artifacts and ringing artifacts. The blocking artifacts will be described with reference to FIG. 6A and FIG. 6B. The ringing artifacts will be described with reference to FIG. 7A and FIG. 7B.

The pipeline following the HEVC standard traditionally postpones the EC operation until the DF operation and the SAO operation are completed, which undesirably increases the size of a buffer for retaining a source pixel and the CI.

To solve such a problem, the video encoding device 10 in accordance with embodiments of the inventive concept further includes a pixel offset pre-calculation (POP) part. The POP part predicts a loop filtered pixel, and calculates a pixel offset prior to the EC operation.

When a quantization error occurs, the compression rate of the VD is reduced. Furthermore, when blocking artifacts occur, users who watch the reproduced moving picture data may feel discomfort. The blocking artifacts are a phenomena in which marks, such as a stair in the reproduced moving picture data, occur.

Figure 6A:
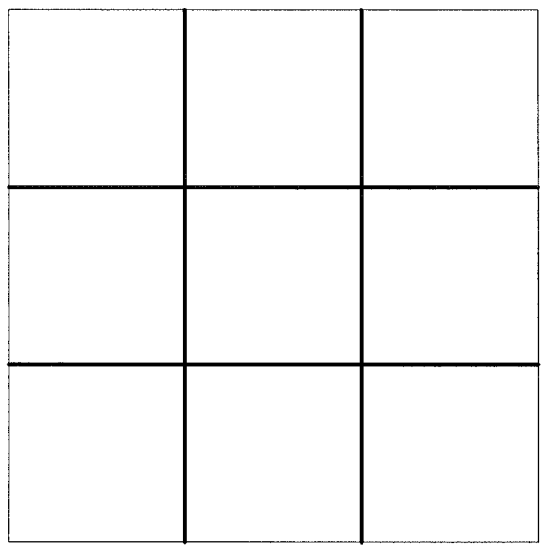
FIG. 6A shows a picture having blocking artifacts.

FIG. 6A shows a picture having the blocking artifacts.

In a picture shown in FIG. 6A, horizontal and vertical boundary lines are shown. The blocking artifacts phenomena occurs by the horizontal and vertical boundary lines.

Figure 6B:
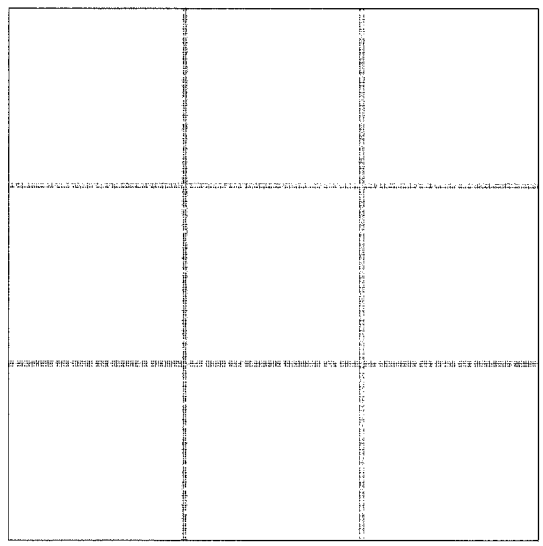
FIG. 6B shows a picture from which the blocking artifacts are removed.

FIG. 6B shows a picture from which the blocking artifacts are removed.

Referring to FIGS. 2, 6A and 6B, the video encoding device 10 modifies a pixel value of the horizontal and vertical boundary lines to a value similar to adjacent pixel values. Thus, in a picture shown in FIG. 6B, the horizontal and vertical boundary lines are removed and become invisible.

The POPDF 108A modifies the pixel value of the horizontal and vertical boundary lines to a value similar to the adjacent pixel values, thereby removing the blocking artifacts phenomena.

Figure 7A:
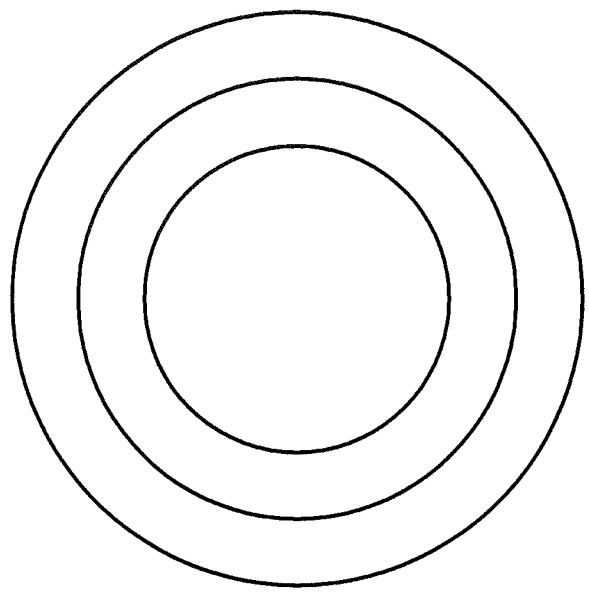
FIG. 7A shows a picture having ringing artifacts.

FIG. 7A shows a picture having ringing artifacts.

Referring to FIGS. 2, 5 and 7A, circle-shaped or ring-shaped boundary lines are shown. In general, the video encoding device 10 may remove the horizontal and vertical boundary lines in a DF operation. However, the POPDF 108A by itself will not remove ring-shaped or diagonal boundary lines.

Figure 7B:
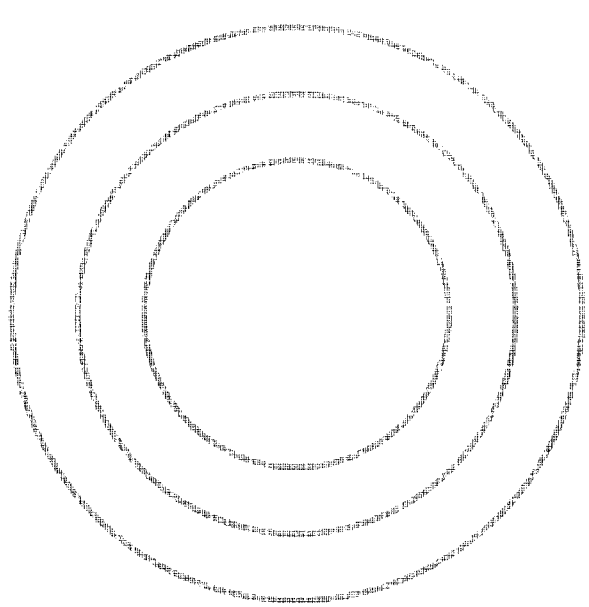
FIG. 7B shows a picture from which the ringing artifacts are removed.

FIG. 7B shows a picture from which the ringing artifacts are removed.

Referring to FIGS. 2, 5, 7A and 7B, to remove the ring-shaped or diagonal boundary lines, the POPSAO part 108B divides ring-shaped boundary lines into categories, and sets an offset based on the category, thus enabling the video encoding device 10 to remove the ring-shaped boundary lines.

Figure 8:
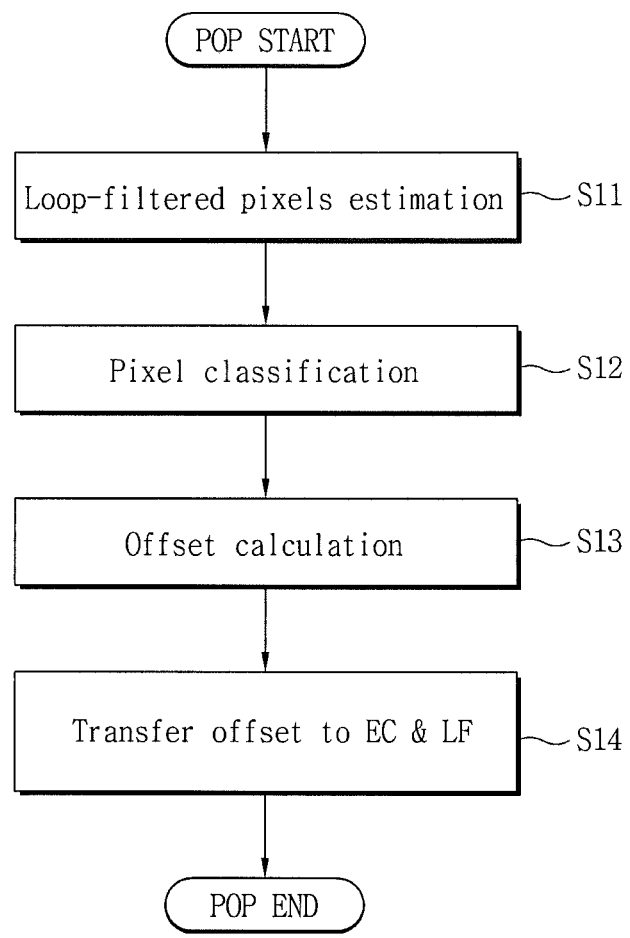
FIG. 8 is a flow diagram illustrating a driving method of a video encoding device in accordance with one embodiment of the inventive concept.

FIG. 8 is a sequential diagram illustrating a driving method of a video encoding device in accordance with another embodiment of the inventive concept.

Referring to FIGS. 2, 5 and 8, at step S11, the POP part 108 predicts the loop filtered pixel. The DF operation is performed when the POP part 108 assigns the coding information and one of the source pixel $P_{so}$, the predicted pixel $P_{pre}$ and the restructured pixel $P_{rec}$ to Equation (1), and thus predicts the loop filtered pixel.

Equation (1) is a function for calculating the predicted a loop-filtered pixel $\hat{r}_i$.

$$\hat{r}_i = f(p_i, QP, BS, MV, \ldots)$$ Equation (1)

$\hat{r}_i$ is a predicted loop-filtered input pixel. $P_i$ is a source pixel.

The CI includes at least one of a BS, MV or QP. The BS denotes a boundary strengthening. The MV denotes a motion vector. The QP denotes a quantized level.

At step S12, the POP part 108 classifies the predicted loop-filtered pixel by a category. In general, the number of categories for the classified pixels following the SAO standard is five. The categories following the SAO standard will be described with reference to FIG. 9 through FIG. 10E.

At step S13, the POP part 108 calculates an offset based on the category and using Equation (2).

$$\operatorname*{argmin}_{o_i} D = \sum_{i \in S} (s_i - (\hat{r}_i + o_i))^2$$ Equation (2)

$S_i$ is a source pixel. $O_i$ is an offset based on category. D is an offset. Arg min f(x) calculates a value of x that minimizes f(x).

At step 14, the POP part 108 transmits the calculated offset to the entropy coding part 106 and the loop filter 109.

Figure 9:
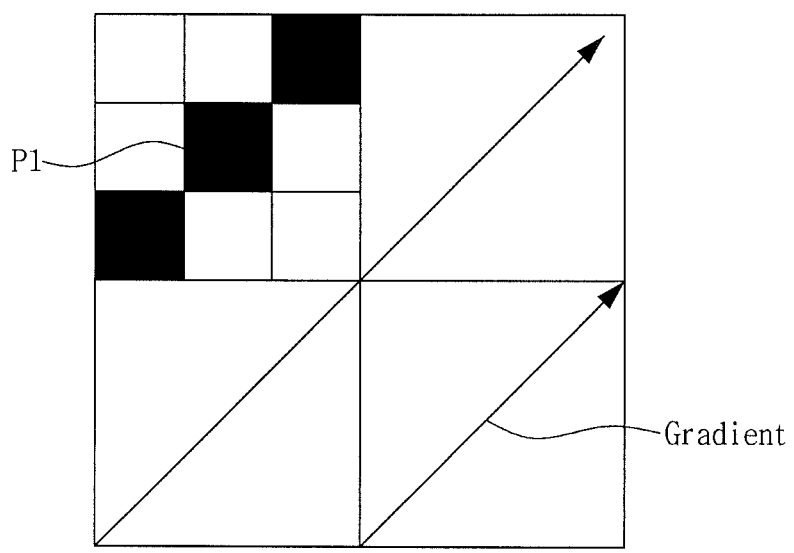
FIG. 9 shows a gradient for one source pixel.

FIG. 9 shows a gradient for one source pixel.

Referring to FIG. 2 and FIG. 9, the POPSAO part 108B calculates a gradient for a predetermined pixel P1—the gradient being classified by a category following the SAO standard.

FIG. 10A through FIG. 10E show the five categories following the SAO standard.

Figure 10A:
FIGS. 10A to 10E show categories following the SAO standard.
Figure 10B:
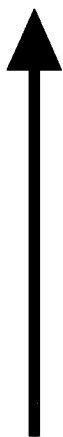
Figure 10C:
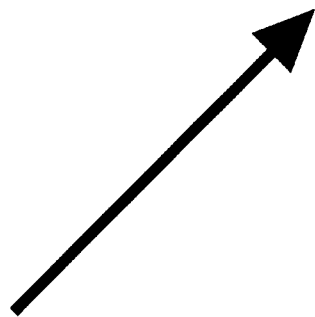
Figure 10D:
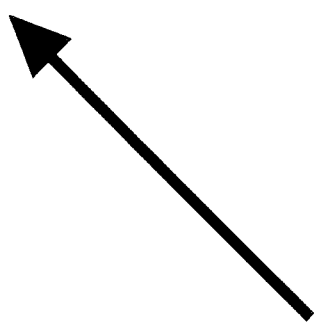
Figure 10E:

The categories following the SAO standard include a horizontal direction shown in FIG. 10A, a vertical direction shown in FIG. 10B, a 45 degree right-tilted direction shown in FIG. 10C, a 45 degree left-tilted direction shown in FIG. 10D, and a band offset.

FIG. 11 shows a pipeline structure of a video encoding device in accordance with an embodiment of the inventive concept. Referring to FIG. 2 and FIG. 11, a pipeline of the video encoding device in accordance with an embodiment of the inventive concept sequentially performs the IME operation, the FME operation, the IPR operation and the EC operation. The POP operation is performed, and then the EC operation is performed. More particularly, the video encoding device 10 simultaneously performs the IPR operation and the POP operation. Furthermore, the video encoding device 10 performs the EC operation, and then the DF operation and the SAO operation are sequentially performed.

The POP part includes an SAO encoding part which generates an offset $\text{Offset}_{SAO}$, and the SAO part includes an SAO decoding part which adds the offset $\text{Offset}_{SAO}$ to the restructured pixel. More particularly, to classify the predicted loop-filtered pixel by a category, the POPSAO part 108B includes encoders and the SAO part 109B is configured only with decoders. The POPSAO part 108B calculates the offset $\text{Offset}_{SAO}$ and the SAO part 109B adds the offset $\text{Offset}_{SAO}$ to the restructured pixel $P_{rec}$. To simultaneously perform the IPR operation and the POP operation, the POP part 108 does not use the restructured pixel $P_{rec}$, but instead uses one of the source pixel $P_{so}$ and the predicted pixel $P_{pre}$.

FIG. 12 shows a pipeline structure of a video encoding device in accordance with another embodiment of the inventive concept. Referring to FIG. 12, a pipeline of a video encoding device in accordance with an embodiment of the inventive concept sequentially performs an IME operation, an FME operation, an IPR operation and an EC operation. A POP operation is performed, and then the EC operation is performed. More particularly, a video encoding device 10 may simultaneously perform the IPR operation and the POP operation. Furthermore, the video encoding device 10 simultaneously performs the EC operation and a DF operation. The video encoding device 10 performs the DF operation, and then performs the SAO operation. To simultaneously perform the IPR operation and the POP operation, the POP part 108 does not use a restructured pixel $P_{rec}$, but instead uses one of a source pixel $P_{so}$ and a predicted pixel $P_{pre}$.

FIG. 13 shows a pipeline structure of a video encoding device in accordance with another embodiment of the inventive concept. Referring to FIG. 13, a pipeline of a video encoding device in accordance with an embodiment of the inventive concept sequentially performs an IME operation, an FME operation, an IPR operation, a POP operation, an EC operation, a DF operation and an SAO operation. The EC operation is performed after the POP operation is performed. The DF operation is performed after the EC operation is performed. The SAO operation is performed after the DF operation is performed. Because the POP operation is performed after, but not simultaneously with, the IPR operation, the POP part 108 uses one of a source pixel $P_{so}$, a predicted pixel $P_{pre}$ and a restructured pixel $P_{rec}$.

FIG. 14 shows a pipeline structure of video encoding device in accordance with another embodiment of the inventive concept. Referring to FIG. 14, a pipeline of a video encoding device in accordance with an embodiment of the inventive concept sequentially performs an IME operation, an FME operation, an IPR operation, a POP operation and an EC operation. The EC operation is performed after the POP operation is performed. More particularly, a video encoding device 10 performs the EC operation and the DF operation at substantially the same time (e.g. in parallel). The video encoding device 10 performs the SAO operation after performing the DF operation. Because the POP operation is performed after, but not simultaneously with, the IPR operation, the POP part 108 uses one of a source pixel $P_{so}$, a predicted pixel $P_{pre}$ and a restructured pixel $P_{rec}$.

Figure 15:
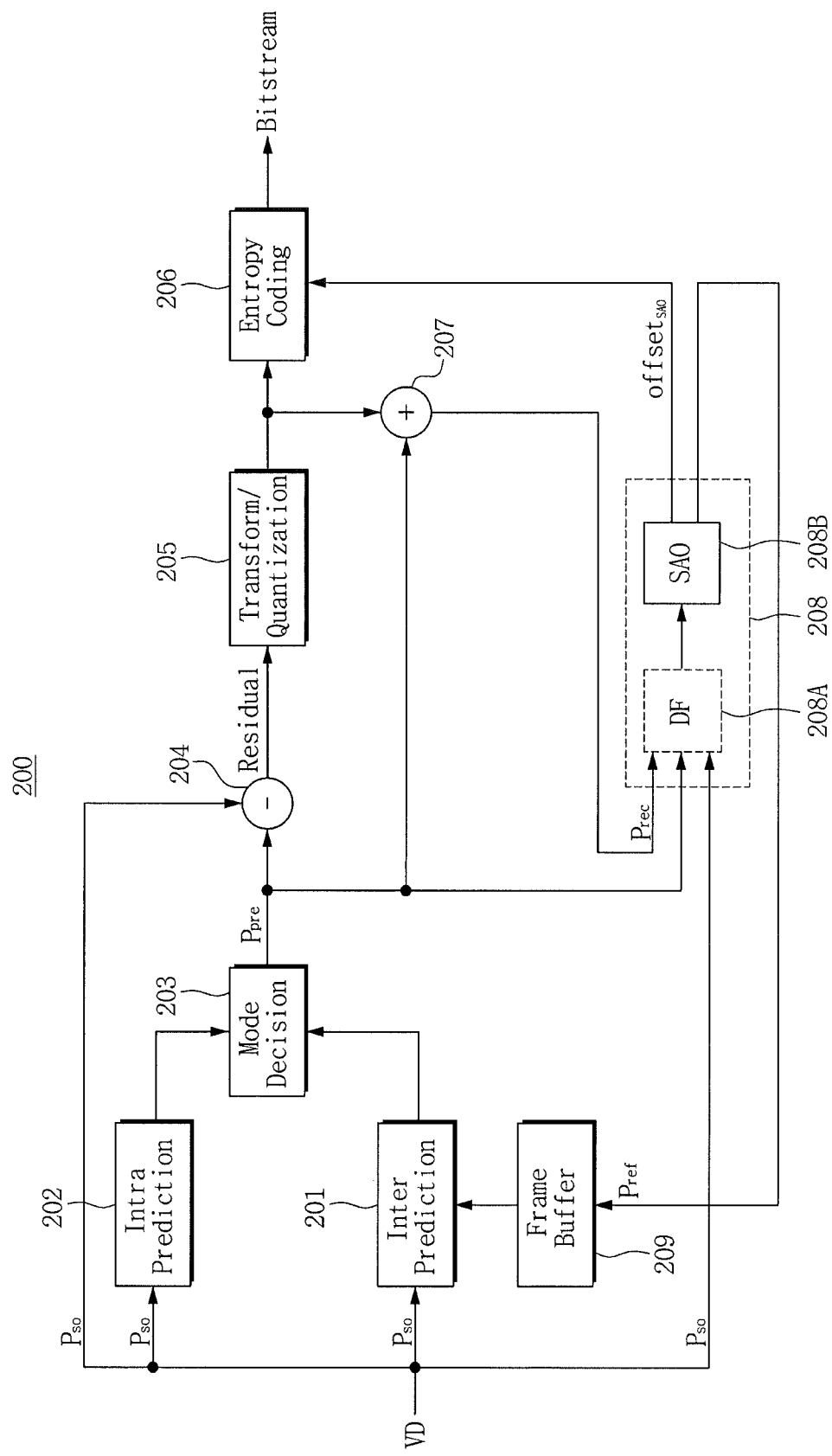
FIG. 15 is a block diagram illustrating a video encoding device in accordance with an embodiment of the inventive concept.

FIG. 15 is a block diagram illustrating a video encoding device 200 in accordance with another embodiment of the inventive concept, which includes a POP part 208 capable of performing the loop filtering. The POP part 208 performs the loop filtering on the VD in video encoding and decoding operations.

The video encoding device 200 includes an inter prediction part 201, an intra prediction part 202, a mode decision part 203, a differential part 204, a transform/quantization part 205, an entropy coding part 206, a summation part 207, a POP part 208 and a frame buffer 209.

Video data (VD) includes a plurality of frames, based on temporal slices, to reproduce a moving picture. Each of the plurality of frames is further subdivided into a two-dimensional matrix (or group) of blocks, (for example 16×16, 32×32 or 64×64). In addition, the VD includes a source pixel $P_{so}$. It should be appreciated that other groups of blocks are envisioned within the scope of this disclosure.

The inter prediction part 201 receives the source pixel $P_{so}$. The inter prediction part 101 divides one frame associated with the source pixel $P_{so}$ into a plurality of blocks, and performs an intra coding operation for removing redundant parts using information from consecutive frames. The inter prediction part 201 generates a predicted pixel $P_{pre}$ based on an inter prediction mode.

The intra prediction part 202 receives the source pixel $P_{so}$. The intra prediction part 202 does not use information from other frames, and performs an inter coding operation for removing redundant parts using characteristics of pictures occurring in one frame from the source pixel $P_{so}$. The intra prediction part 202 generates a predicted pixel $P_{pre}$ based on an intra prediction mode.

The mode decision part 203 determines whether it is the inter prediction mode or the intra prediction mode. Furthermore, the mode decision part 203 determines whether it is an 8×8 or 16×8 mode in the inter prediction mode. The mode decision part 203 generates the predicted pixel $P_{pre}$ based on the Mode.

The mode decision part 203 generates coding information (CI). The CI includes at least one of a BS, Mode, MV or QP. The BS denotes a boundary strengthening. The Mode denotes whether it is the intra prediction mode or the inter prediction mode. The MV denotes a motion vector. The QP denotes a quantized level.

The differential part 204 generates a residual value by calculating the difference between video data (e.g. the source pixel $P_{so}$) and the predicted pixel $P_{pre}$.

The transform/quantization part 205 performs a discrete cosine transform, quantizes the residual values, and generates a quantized transform coefficient. The entropy coding part 206 then generates a bit stream using the quantized transform coefficient and SAO $Offset_{SAO}$ received from the POP part 208.

The summation part 207 generates a restructured pixel $P_{rec}$ using an inversion and dequantization value from the transform/quantization part 205 and the predicted pixel $P_{pre}$ received from the mode decision part 203. The summation part 107 transmits the restructured pixel $P_{rec}$ to the POP part 208.

The POP part 208 includes a DF 208A and an SAO part 208B. The POP part 208 follows the HEVC standard. In one embodiment, the POP part 208 does not include the DF 208A and the head (e.g. preamble) of each frame includes an instruction to forgo the de-blocking operation for video encoding and decoding operations.

The POP part 208 receives the restructured pixel $P_{rec}$ from the summation part 207. The POP part 208 receives the source pixel $P_{so}$. The POP part 208 receives the predicted pixel $P_{pre}$ from the mode decision part 203. In one embodiment, the POP part 208 also receives the CI including at least one of a BS, Mode, MV and QP from the mode decision part 203.

The SAO part 208B classifies one of the source pixel $P_{so}$, the predicted pixel $P_{pre}$, and the restructured pixel $P_{rec}$ by a category, and calculates an offset $Offset_{SAO}$ based on the category. The SAO part 208B transmits the offset $Offset_{SAO}$ to the entropy coding part 206. Furthermore, the SAO part 208B adds the offset $Offset_{SAO}$ to the restructured pixel $P_{pre}$. Therefore, the SAO part 208B generates a reference pixel $P_{ref}$. The SAO part 208B transmits the reference pixel $P_{ref}$ to a frame buffer 209.

The frame buffer 209 stores the reference pixel $P_{ref}$ received from the POP part 208. When one frame is made by summation of all blocks, the frame buffer 209 transmits the reference pixel $P_{ref}$ to the inter prediction part 201.

Figure 16:
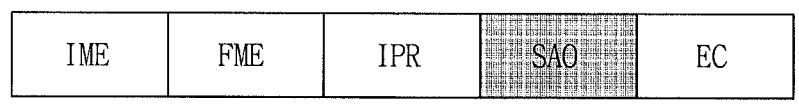
FIG. 16 shows a pipeline operation of the video encoding device shown in FIG. 15.

FIG. 16 shows a pipeline operation of the video encoding device shown in FIG. 15.

Referring to FIGS. 15 and 16, a pipeline of the video encoding device 200 in accordance with an embodiment of the inventive concept sequentially performs the IME operation, the FME operation, the IPR operation, the SAO operation and the EC operation. The video encoding device 200 sequentially performs the IME operation, the FME operation, the IPR operation, the SAO operation, and the EC operation.

The SAO part includes a SAO encoding part to generate the offset $Offset_{SAO}$, and a SAO decoding part to add the offset $Offset_{SAO}$ to the restructured pixel. More particularly, in order to classify the predicted loop-filtered pixel by a category, the SAO part 208B is configured with encoders and decoders. That is, the SAO part 208B calculates the offset $Offset_{SAO}$, adds the offset $Offset_{SAO}$ to the restructured pixel $P_{rec}$, and generates the reference pixel $P_{ref}$.

Figure 17:
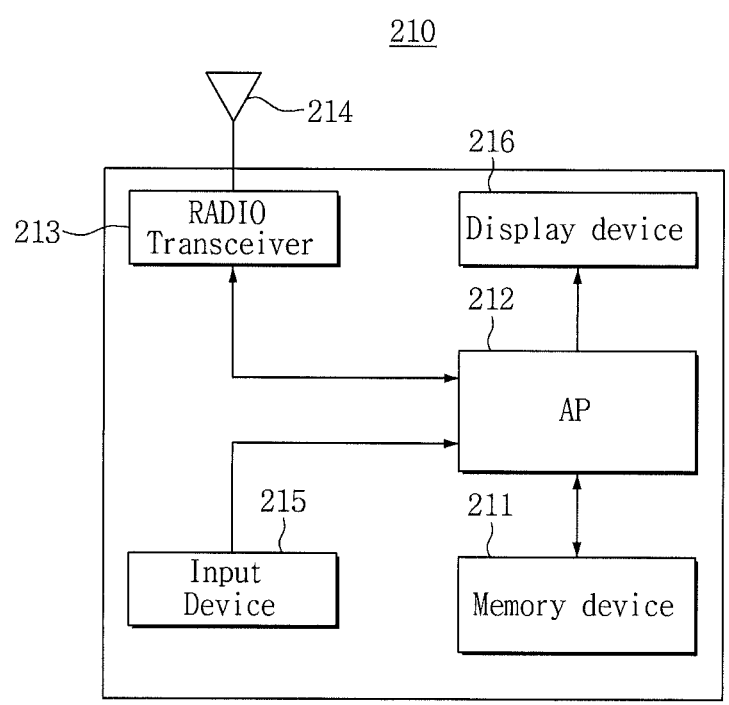
FIG. 17 shows an embodiment of a computer system including the AP shown in FIG. 1.

FIG. 17 shows an embodiment of computer system 210 including the AP shown in FIG. 1. A computer system includes, but is not limited to, a desktop computer, a tablet computer and a mobile smart phone (e.g. a cellular phone with computing capabilities).

Referring to FIG. 17, a computer system 210 includes a memory device 211, an application processor (AP) 212 including a memory controller configured to control the memory device 211, a radio transceiver 213, an antenna 214, an input device 215 and a display device.

The radio transceiver 213 transmits (or receives) wireless signals to (or from) the antenna 214. For example, in one embodiment, the radio transceiver 213 converts the wireless signals received from the antenna 214 to signals to be processed in the AP 212.

The AP 212 processes output signals received from the radio transceiver 213, and the output signals are transmitted to the display device 216 (e.g. a CRT, Plasma or LCD screen) In addition, the radio transceiver 213 converts output signals received from the AP 212 to the wireless signals, and the wireless signals are transmitted to an external device through the antenna 214 and output from the external device.

As the input device 215 receives control signals configured to control the AP 212 operation and data to be processed in the AP 212. In one embodiment, the input device 215 is a touch pad, a computer mouse, a key pad or a keyboard.

According to various embodiments, the AP 212 includes the AP 1 shown in FIG. 1.

Figure 18:
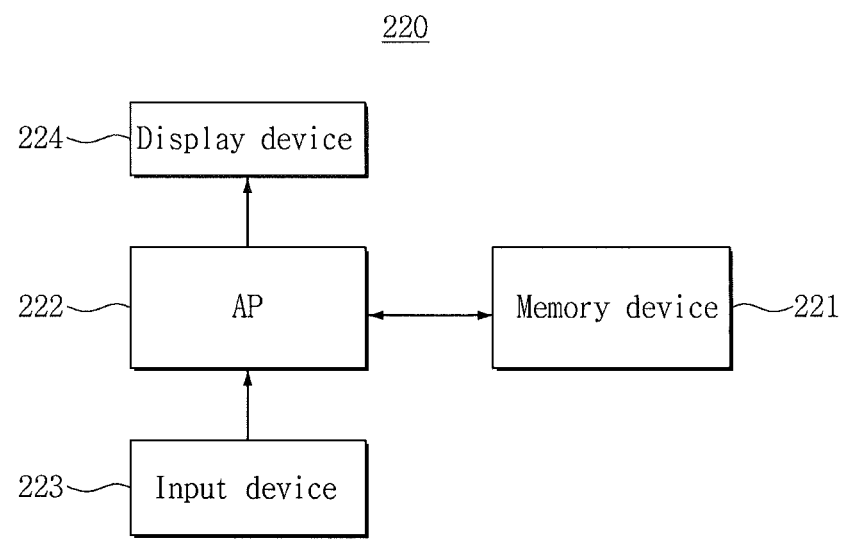
FIG. 18 shows an embodiment of a computer system including the AP shown in FIG. 1.

FIG. 18 shows another embodiment of computer system 220 including the AP 1 shown in FIG. 1.

Referring to FIG. 18, a computer system 220 includes a personal computer (PC), a network server, a tablet PC, a net-book, an e-reader, a personal digital assistant (PDA), a portable multimedia player (PMP), an MP3 player or an MP4 player.

The computer system 220 includes a memory device 221, an AP 222 including a memory controller configured to control a data processing operation of the memory device 221, an input device 223 and a display device 224.

The AP 222 displays data stored in the memory device 221 based on input data through the input device 223 on the display device 224. For example, the input device 223 is a touch pad, a computer mouse, a keypad or a keyboard. The AP 222 controls overall operations of the computer system 220, and controls operation of the memory device 221.

According to certain embodiments, the AP 222 includes the AP 1 shown in FIG. 1.

Figure 19:
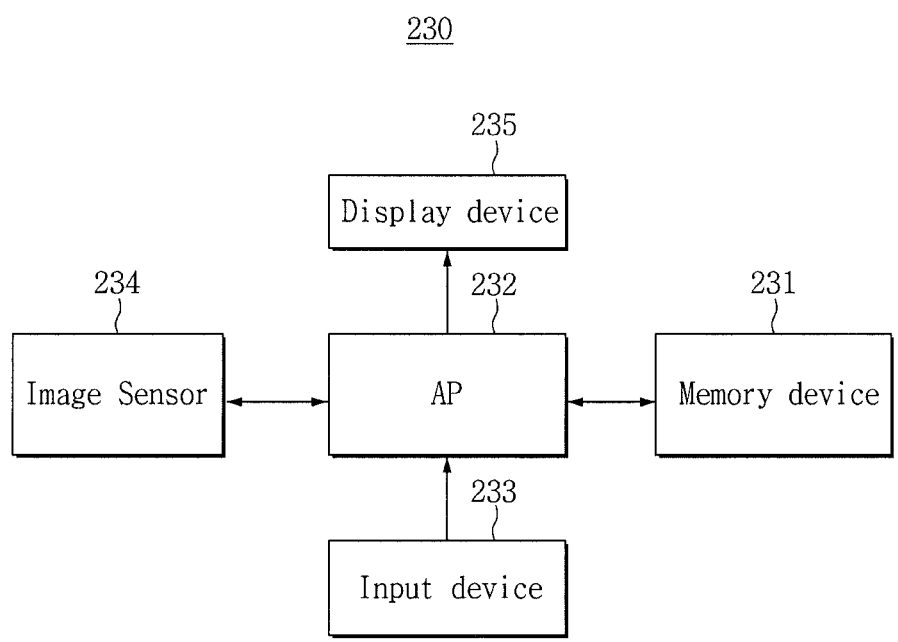
FIG. 19 shows an embodiment of a computer system including the AP shown in FIG. 1.

FIG. 19 shows another embodiment of computer system 230 including the AP shown in FIG. 1.

Referring to FIG. 19, one embodiment of a computer system 230 includes a picture process device, such as a digital camera or mobile phone having a digital camera, a smart phone or a tablet PC.

The computer system 230 further includes a memory device 231 and an AP 232 including a memory controller configured to control a data processing operation, such as a write operation or a read operation, an input device 233, an image sensor 234 and a display device 235.

The image sensor 234 of the computer system 230 converts optical images to digital signals, and the converted digital signals are transmitted to the AP 232. According to control of the AP 232, the converted digital signals are displayed on the display device 235 or stored in the memory device 231.

Furthermore, the data stored in the memory device 231 is displayed on the display device 235 based on control of the AP 232.

As the input device 233 receives control signals configured to control the AP 232 operation and data to be processed by the AP 232, in one embodiment, the input device 233 is a touch pad, a computer mouse, a keypad or a keyboard.

According to certain embodiments, the AP 232 includes the AP 1 shown in FIG. 1.

A video encoding device in accordance with embodiments of the inventive concept performs an entropy coding operation, and then performs a loop filter operation. Thus, the size of a buffer for retaining a source pixel and the coding information in the video encoding system need not be increased in order to perform the entropy coding operation.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A video encoding device comprising:
a pixel offset pre-calculation (POP) part configured to generate a predicted loop-filtered pixel from a coding information (CI) and at least one of a source pixel, a predicted pixel and a restructured pixel, and configured to generate an offset from the predicted loop-filtered pixel by performing a sample adaptive offset (SAO) operation;
an entropy coding (EC) part configured to generate a bit stream from the offset, the POP part connected to the EC part without a buffer therebetween, to communicate the offset to the EC part; and
a loop filter (LF) configured to receive the offset from the POP part and generate a reference pixel based on the restructured pixel and the received offset,
wherein the POP provides the offset to the EC and the LF.

2. The video encoding device of claim 1, wherein the POP part includes a pixel offset pre-calculation de-blocking filter (POPDF) configured to smooth an edge within a video data to create a de-blocked filtered pixel, the edge existing between or within blocks of a frame of the video data, and a pixel offset pre-calculation sample adaptive offset (POP-SAO) part configured to classify the de-blocking filtered pixel by a category and generate the offset corresponding to the respective category.

3. The video encoding device of claim 1, wherein the SAO operation classifies the predicted loop-filtered pixel by a category, and generates the offset based on the classified category.

4. The video encoding device of claim 1, wherein the CI includes one of a boundary strengthen (BS), a Mode, a motion vector (MV) and a quantization parameter (QP).

5. The video encoding device of claim 1, wherein the LF includes a de-blocking filter configured to perform de-blocking filtering on the restructured pixel, and an SAO part configured to add the offset to the restructured pixel and generate the reference pixel.

6. An application processor comprising:
a memory controller configured to control a memory device for reproducing moving picture data; and
a video encoding device configured to receive the moving picture data through the memory controller,
wherein the video encoding device includes a pixel offset pre-calculation (POP) part configured to receive each of a source pixel, a predicted pixel and a restructured pixel, configured to generate a predicted loop-filtered pixel from a coding information (CI) and at least one of the source pixel, the predicted pixel and the restructured pixel, and configured to generate an offset from the predicted loop-filtered pixel by performing a sample adaptive offset (SAO) operation, and an entropy coding (EC) part configured to generate a bit stream from the offset, the POP part connected to the EC part without a buffer therebetween, to communicate the offset to the EC part,
wherein the video encoding device includes a loop filter (LF) configured to receive the offset from the POP part and generate a reference pixel based on the restructured pixel and the received offset.

7. The application processor of claim 6, wherein the POP part includes a pixel offset pre-calculation de-blocking filter (POPDF) configured to smooth an edge within a video data to create a de-blocked filtered pixel, the edge existing between or within blocks of a frame of the video data, and a pixel offset pre-calculation sample adaptive offset (POP-SAO) part configured to classify the de-blocking filtered pixel by a category and generate the offset corresponding to the respective category.

8. The application processor of claim 6, wherein the video encoding device has a pipeline structure.

9. The application processor of claim 8, wherein the pipeline includes an integer-pel motion estimation (IME) part, a fractional-pel motion estimation (FME) part, an intra prediction with reconstruction (IPR) part, a POP part, an EC part, and a loop filter (LF).

10. The application processor of claim 9, wherein the video encoding device sequentially performs an IME operation with the IME part, an FME operation with the FME part and an IPR operation with the IPR part.

11. The application processor of claim 10, wherein the video encoding device simultaneously performs the IPR operation and a POP operation.

12. The application processor of claim 11, wherein the video encoding device performs an LF operation after an EC operation performed with the EC part is completed.

13. The application processor of claim 10, wherein the video encoding device performs a POP operation with the POP part, before performing an EC operation.

14. The application processor of claim 10, wherein the LF includes a de-blocking filter (DF) and an SAO part, and the video encoding device sequentially performs a DF operation with the DF and an SAO operation with the SAO part.

15. The application processor of claim 11, wherein the video encoding device simultaneously performs an EC operation and a DF operation.

16. A driving method of a video encoding device, comprising:
performing a pixel offset pre-calculation (POP) operation, by a POP part, by generating a predicted loop-filtered pixel from a coding information and at least one of a source pixel, a predicted pixel and a restructured pixel, the POP operation further generating an offset from the predicted loop-filtered pixel by performing a sample adaptive offset (SAO);
generating, by an entropy coding (EC) part, a bit stream from the offset, the offset communicated to the EC part without communicating the offset to a buffer; and
performing a loop filtering (LF) operation by receiving the offset from the POP part and generating a reference pixel based on the restructured pixel and the received offset.

17. The driving method of claim 16 further comprising performing a loop filtering (LF) operation with an LF part after performing an EC operation with the EC part.

18. The driving method of claim 17, wherein the LF operation includes:
smoothing an edge within a video data, with a de-blocking filter (DF), to create a de-blocked filtered pixel, the edge existing between or within blocks of a frame of the video data, the blocks corresponding to the restructured pixel; and
adding an offset to the restructured pixel by performing an SAO operation.

19. The driving method of claim 16 further comprising:
receiving the source pixel and predicting a motion vector in a unit of a fractional pixel, by an integer-pel motion estimation (IME) part; and
performing an intra prediction and reconstruction (IPR) operation by intra predicting to generate an intra predicted pixel and generating the restructured pixel corresponding to the intra predicted pixel.

20. The driving method of claim 19, wherein the IPR operation and the POP operation are performed simultaneously.

* * * * *